Patented Nov. 16, 1937

2,099,175

UNITED STATES PATENT OFFICE 2,099,175

PROCESSED SUGAR AND METHOD OF MAKING THE SAME

Marion D. Rounds, South Braintree, Mass.

No Drawing. Application May 29, 1935,
Serial No. 24,103

3 Claims. (Cl. 99—134)

This invention relates to ingredients used in making boiled cake frostings, fudges and the like and particularly to a novel ingredient which, by imparting a creamy texture to the cooked materials commonly employed in making such comestibles, eliminates the necessity for the beating operations heretofore commonly employed for creaming the product. As will appear, my novel ingredient also furnishes a preservative medium which maintains the frosting or fudge in its fresh, moist condition for a long period of time whereby drying or hardening of the frosting or fudge, is materially decreased.

Heretofore, in making boiled cake frostings, fudge and similar comestibles which I shall hereinafter refer to generally as confectionery, the ingredients, comprising chiefly sugar, milk or water, and a flavoring, are mixed together and boiled to the proper temperature, after which the cooked mass is subjected to a thorough beating operation for the purpose of breaking up the granules of sugar and for producing a creamy texture in the finished confectionery. This beating operation is an ardous one and in the commercial manufacture of fudge it has not been uncommon to employ, as an ingredient, a substance, commonly designated as stock fondant, which may be added to the fudge after it has been boiled and which produces a creamy texture without the necessity for any substantial beating operations. The chief constituents of such commercial fondants are finely divided sugar and cornstarch, the latter ingredient being employed to preserve the fondant. Such fondants have had their limitations when used by commercial candy makers and are entirely impractical for use by the housewife, due to the fact that the fondant itself cannot be stored for any length of time without taking precautions to counteract the inherent tendency of the fondant to dry up. Furthermore, this tendency of the fondant to become hard and dry persists after it has been incorporated into the confectionery and heretofore it has been the common practice of commercial manufacturers to employ glucose to counteract the drying activity of the fondant and to preserve the confectionery in which the fondant is used, for a short time at least. Such use of glucose is undesirable because of its peculiar taint and other undesirable characteristics which has caused it to become identified with cheaper confectionery, and glucose is not a substance which the housewife cares to use in making confectionery.

It is an object of my invention to provide an ingredient for confectionery, and method of making the same, which is highly effective in its creaming properties, which does not require glucose as an adjunct to its use, and which not only does not itself dry up on continued storing, but which acts as a preservative medium to counteract the tendency of the confectionery in which it is used to dry and become hard, thereby preserving the confectionery in its fresh, moist condition.

In making my novel product I first prepare a mixture of sugar, cornstarch and cream of tartar to which mixture a suitable amount of water is added. The proportions of the foregoing ingredients are subject to some variation, but in general it may be stated that on the basis of approximately 10 pounds of granulated sugar, the amount of cornstarch used is between approximately 1½ and 3½ teaspoonsful, with less than 1½ teaspoonsful of cream of tartar.

The mixture so prepared is boiled and, after cooling, it is beaten or kneaded thoroughly until it is stiff and of a creamy texture. The product so prepared may then be put into suitable containers and be stored away for future use in making confectionery as hereinafter more fully described.

Although I have stated above the general proportions of ingredients which should be used and the general method of treating the same, I have found that for best results, accurately measured ingredients in the following proportions should be used and they should be subjected to the following treatment:

10 pounds of granulated sugar
2½ teaspoons of cornstarch
½ teaspoon of cream of tartar
7½ cups of water
½ teaspoon of salt The foregoing materials are placed in a kettle, and, after mixing, are boiled to a temperature of 238° Fahrenheit. This temperature, which I have found to be the most effective one for producing the desired characteristics of my novel preparation is given relative to a water boiling point of 212° F., and varies with atmospheric conditions as does the boiling point of water. Taking into consideration variable atmospheric conditions, the temperature to which the ingredients of my preparation should be boiled may therefore more accurately be stated as a temperature 26° F. higher than the boiling point of water.

During the cooking, the sides of the kettle should be cleaned, preferably with a wet brush, to remove crystal formations on the sides of the kettle and I have found that this step also tends to remove impurities which separate from the sugar during the cooking.

As soon as a thermometer inserted in the boiling mass indicates that the temperature prescribed above has been reached, the heat is shut off and immediately thereafter the sides of the kettle are once again cleaned to remove whatever crystals may have formed during the last stages of the cooking. The cooked mass is then poured onto a marble slab and it is immediately sprinkled lightly with cold water for the purpose of dissolving any crystals which may remain in the mass. A bubble on the surface of the mass will indicate the presence of a crystal and the crystal may be removed by depositing a drop of cold water on the bubble, while the mixture is hot, thereby effectively dissolving the crystal.

As the mass approaches a temperature at which it feels cool to the touch, it is kneaded or worked with a scoop or spatula until the mass has hardened to the consistency of hard fudge, that is, fully creamed, and I have found that the kneading operation, if done by hand, takes approximately one-half hour for a batch of the size indicated above. The material can, of course, be more rapidly creamed and kneaded in a mechanical creaming machine.

As soon as the desired stiff consistency is reached the mixture is cut up and put in containers and is ready for use. I have found that the mixture will soften somewhat within 24 hours after it is put in the containers and will assume the consistency of peanut butter, but after it has so softened it will remain unaltered during a long period of time when it may be stored on the shelves of the grocer or housewife.

In using my novel material as an ingredient in making fudge, for example, the cook mixes in a pan the milk, cocoa, sugar and any other ingredients which she commonly uses and boils the same in the usual manner, commonly until a soft ball is formed in cold water. Butter or other ingredients may then be added as desired.

Heretofore, the cooked mass, so prepared, would then have been beaten thoroughly to cream the mixture, but in using my preparation the beating step is eliminated and, as a substitute therefor, a small quantity of my preparation made as above is added to the cooked mass after the boiling and, conveniently, at the time the butter is added. After the addition of these ingredients, including my preparation, the mixture is allowed to stand without stirring until it has cooled considerably, after which the mixture is stirred until all of the ingredients which were last added are thoroughly blended throughout the mixture. The fudge may then be poured into a buttered pan without beating or further stirring, and, after setting, may be cut in squares and served. The resultant product will be found to possess a creamy texture which is superior to that of the common home-made fudges which have been laboriously beaten for a long period after cooking. Furthermore, it will be found that the fudge will not harden or dry up for a long period of time but will be preserved in its desired moist and fresh condition.

The proper amount of sugar to be used when my novel preparation is later to be added may vary slightly from the amount commonly used as will readily be appreciated by the cook accustomed to making confectionery of this character. However, the following recipe for making fudge, which is recommended for use with my preparation, is substantially the same as recipes heretofore commonly used, except for the addition of my novel ingredient:

2 cups sugar
    ¼ teaspoon salt
    6 heaping tablespoons cocoa
    1 cup milk

After the foregoing ingredients are boiled in the usual manner, there should be added:

2 tablespoons butter
    1 teaspoon vanilla
    6 tablespoons my preparation

The making of boiled cake frostings has been a troublesome problem to the housewife heretofore, due not only to the necessity for prolonged beating, but particularly because of the inherent property of such frostings to harden shortly after being applied to the cake. My preparation eliminates this difficulty and I have found that boiled frostings in which my preparation has been used as an ingredient maintain their fresh condition for a long period of time,—indeed the frosting will remain soft and moist until long after the cake itself has become too stale to be edible.

In using my preparation to make a boiled cake frosting the same general formula is employed as that prescribed above for making fudge,—namely, the preparation is added after the ingredients have been boiled and as a substitute for the beating operation. As a recipe for making boiled cake frostings with the use of my preparation, the following is prescribed:

½ cup sugar
    ⅓ cup milk
    Pinch of salt

After the foregoing ingredients have been boiled in the usual manner, the following ingredients are added:

Walnut-size of butter
    ¼ teaspoon vanilla
    1 square chocolate
    1 tablespoon my preparation It will be noted that the amount of my preparation to be used varies with the kind of confectionery being made. Thus, the fudge recipe prescribes the use of an amount of my preparation equal to approximately one-fourth of the quantity of sugar used in making the fudge. In making boiled cake frostings a lesser quantity of my preparation is employed, as less creaminess is desired, and in the foregoing recipe I have prescribed approximately one part preparation to six parts of the sugar ingredient of the frosting.

From the foregoing description it will be apparent that I have provided a substance which, by eliminating the undesirable characteristics of prior products of a similar nature, furnishes a practical, and remarkably useful, adjunct to the preparation of fudges, boiled cake frostings and similar confectionery. By eliminating the necessity for employing glucose in connection with the use of such a preparation, I enable the commercial confectioner to make a better product without the undesirable properties which attend the use of glucose and I make the preparation readily usable by the housewife. By providing a material which itself has remarkable preserving qualities, and therefore can be stored on the shelves of the grocer or housewife, I have made the preparation available to the housewife and by providing a substance which acts as a preservative in the fudge or frosting, I have enabled the housewife to make boiled cake frostings and the like which do not become hard and dry but which maintain their moist freshness for a long period.

It will be apparent that my invention is subject to various modifications within the spirit of my invention which is to be limited only as indicated in the appended claims.

I claim:

1. A material adapted for use as an ingredient in making cooked frosting, fudge, and similar confectionery, for imparting a creamy texture thereto without beating, which comprises a cooked mixture of sugar, cornstarch, cream of tartar and water, said mixture having a creamy texture and a soft, moist consistency, said cornstarch and cream of tartar being proportioned with each other and with the sugar to maintain said consistency stable over long periods of time.

2. A material adapted for use as an ingredient in making cooked frosting, fudge, and similar confectionery, for imparting a creamy texture thereto without beating which comprises a cooked mixture of sugar, cornstarch, cream of tartar and water, said sugar, cornstarch and cream of tartar being in the proportions, relative to 10 pounds of sugar, of approximately 1½ to 3½ teaspoonsful of cornstarch and cream of tartar in an amount not exceeding 1½ teaspoonsful, said mixture having a creamy texture and a soft, moist consistency stable over long periods of time.

3. The step in the method of preparing boiled cake frosting, fudge, and similar confectionery, which consists in adding to the cooked but unbeaten ingredients of the confectionery, in the absence of glucose, a soft, moist, creamy, cooked mixture of sugar, cream of tartar and cornstarch, in the proportion of approximately one part of said mixture to from four to six parts of the sugar portion of the said ingredients, to cream the said ingredients without beating the same.

MARION D. ROUNDS.